June 19, 1934. M. PIPKIN Re. 19,216

COLORED OR DIFFUSING COATING FOR INCANDESCENT LAMPS AND SIMILAR ARTICLES

Original Filed Sept. 20, 1926

INVENTOR:
MARVIN PIPKIN,
BY Charles E. Mullen
HIS ATTORNEY.

Reissued June 19, 1934

Re. 19,216

UNITED STATES PATENT OFFICE 19,216

COLORED OR DIFFUSING COATING FOR INCANDESCENT LAMPS AND SIMILAR ARTICLES

Marvin Pipkin, Cleveland Heights, Ohio, assignor to General Electric Company, a corporation of New York Original No. 1,706,182, dated March 19, 1929, Serial No. 136,393, September 20, 1926. Application for reissue September 10, 1930, Serial No. 481,042

16 Claims. (Cl. 41—26)

My invention relates to the application of a light diffusing or coloring medium to electric incandescent lamp bulbs and similar articles. Heretofore this has been done by applying such medium to the outer surface of a clear glass bulb. This method has the disadvantage that it increases considerably the absorption of light inasmuch as the highly reflective inner surface of the bulb remains. The outside coated lamps have also the disadvantages that dirt adheres more easily to them.

It is the object of my invention to overcome these various objections and this I do by applying the light diffusing or coloring medium to the inside surface of the bulb. The coating is applied in such a way that it comprises particles of the diffusing medium which adhere to the inner surface of the bulb without being fused thereto. According to one form of my invention, I apply said medium to the etched inner surface of the bulb and preferably to the inner bulb surface frosted by etching as by the method disclosed in Pipkin Patent No. 1,687,510, issued October 16, 1928. This has the advantage that the rough etched surface serves to hold the medium to the glass, and I have that it is unnecessary to employ a special adhesive or binding medium.

Figure 1:
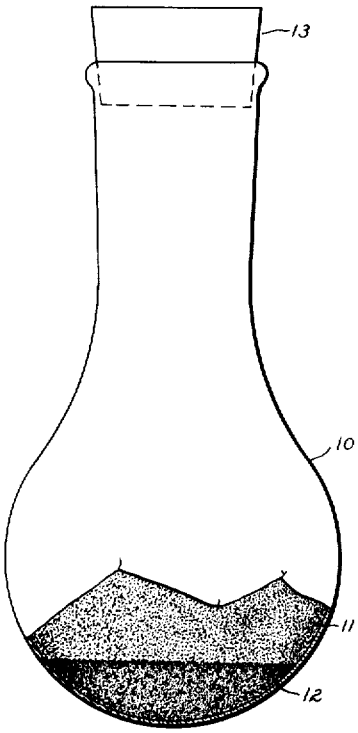
Figure 3:
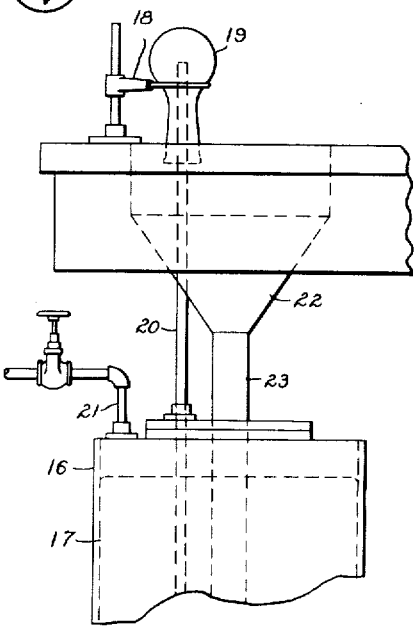
Figure 2:
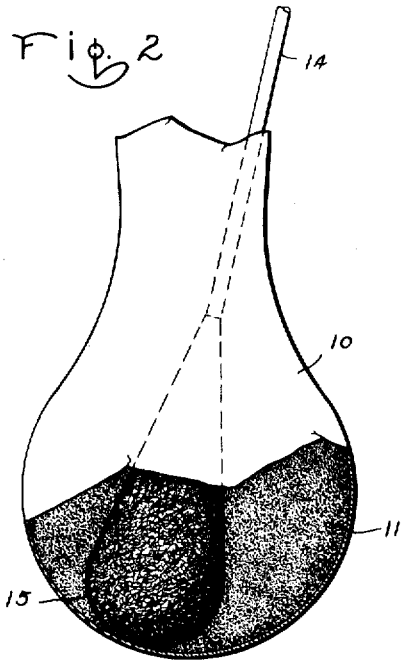
Figure 4:
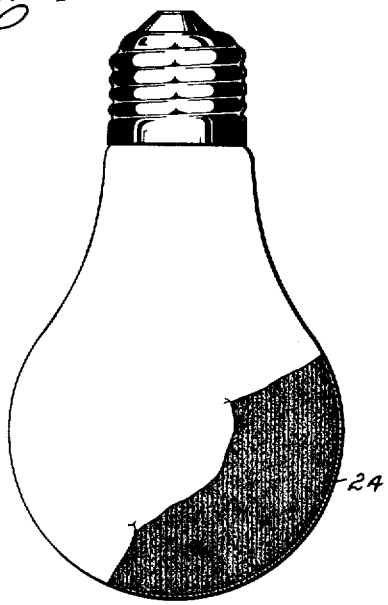

My invention may be more fully understood by referring to the accompanying drawing in which Fig. 1 is an elevation of an incandescent lamp bulb partially broken away for clearness; Fig. 2 is a fragmentary elevation of an incandescent lamp bulb partially broken away in order that a color applying means may be shown inserted therein; Fig. 3 is a fragmentary elevation of an apparatus which may be used in carrying out a modified method; and Fig. 4 is an elevation of a completed lamp partially broken away showing a series of lines which indicate the color on the inner surface thereof.

Referring now to the drawing, and especially Fig. 1, an incandescent lamp bulb 10 is shown having its inside surface 11 frosted according to the method set forth in my prior patent hereinbefore referred to. To apply a color or tint, a quantity of dry powdered pigment 12 of the desired color may be introduced into the bulb and allowed to deposit over the glass surface by moving and turning the bulb so that color may be uniformly distributed. A cork or stopper 13 is inserted into the neck of the bulb so as to prevent the escape of the powdered pigment during the coloring operation. After the bulb has been properly colored or tinted, the express pigment powder is transferred to another bulb for coloring and, if necessary, any loose pigment remaining in the colored bulb may be blown out by the use of compressed air.

In Fig. 2 is shown another way of applying the dry pigment powder to the inside surface of the bulb. This is by means of a brush 14, the lower end 15 of which is supplied with a quantity of dry pigment. It will be obvious that a mechanically driven buffer could be used in place of the manually operated brush.

The coloring material used should be of such a character that it will not give off gases injurious to the lamp filament at lamp operating temperature. I have obtained good results by using ceramic pigments, especially mineral colors which remain permanent and do not affect the life or efficiency of the lamps. Examples are the various pigments, principally metallic oxides, sulphides, and silicates used in the paint and glass industries. Of course the pigment used depends upon the color desired. For instance, for so-called "flame-tint" lamps, I have successfully used a pigment known commercially as transparent red No. 176 put out by B. F. Drakenfelt & Company, Inc.; for pink bulbs, a pigment known as red No. 12,577 put out by The O. Hommel Company; for orange bulbs, a lead chromate known as C. P. Orange chrome yellow put out by Tock Brothers; for green or blue, mineral colors known as emerald green, 788 D, and blue No. 6990—O. G. put out by Roessler and Hasslacher Company; and for an opal finish, I use either barium sulphate or ground natural cryolite.

Another method of applying a light diffusing or coloring medium to the inside surface of a glass article is by flushing or spraying the inside frosted surface of the glass article with a liquid or solution containing the desired color. A solution is used containing a compound or compounds in solution or suspension which will, when dry, or upon the application of heat, break up into a substance which has the desired color. Solutions which have been found suitable are ferric chloride in solution or ferric hydroxide in suspension, also chromic chloride in solution or chromic hydroxide in suspension in water or other carrying liquid.

In Fig. 3 is shown an apparatus for applying the coloring solution to the inside frosted surface of a glass article, and comprises a reservoir 16 containing the coloring solution 17. A suitable holder 18 is provided which serves to support the glass article which, as shown, is an incandescent lamp bulb 19. The coloring solution is forced up through a pipe 20 to the inside of the lamp bulb by air pressure applied through a pipe 21. The surplus coloring solution returns to the reservoir through the funnel 22 and pipe 23. After the inside surface of the bulb has been thoroughly washed with the coloring solution, the bulb is allowed to drain and when comparatively dry, it is heated in an oven at a suitable temperature until the desired color is imparted thereto. In Fig. 4 is shown a completed electric incandescent lamp, the bulb of which is partially broken away so as to show the inside surface 24 which is colored.

It will be apparent that the lamp hereinabove described constitutes a decorative lamp having a coating on the entire interior surface of the light transmitting portion, and that the coating on the interior surface of this lamp is a visible and light diffusing coating when originally applied and prior to any use or operation of the lamp.

What I claim as new and desire to secure by Letters Patent of the United States is:—

1. The method of producing diffusing or colored bulbs for electric incandescent lamps and similar articles which consists in etching a surface thereof and then applying thereto a diffusing or coloring medium so as to produce a deposit of the finely divided medium in the depressions of said etched surface to serve without additional binding medium as the finished coating.

2. The method of producing diffusing or colored bulbs for electric incandescent lamps and similar articles which consists in etching a surface thereof and then rubbing a finely divided diffusing or coloring medium into said etched surface.

3. The method of producing diffusing or colored bulbs for electric incandescent lamps and similar articles which consists in frosting by etching a surface thereof, and then applying thereto a diffusing or coloring medium so as to produce a deposit of the finely divided medium in the depression of said frosted surface to serve without additional binding medium as the finished coating.

4. The method of producing diffusing or colored bulbs for electric incandescent lamps and similar articles which consists in frosting by etching a surface thereof, and then rubbing a finely divided diffusing or colored medium into said frosted surface.

5. The method of producing diffusing or colored bulbs for electric incandescent lamps and similar articles which consists in etching the inside surface thereof, and then applying thereto a diffusing or coloring medium so as to produce a deposit of the finely divided medium in the depressions of said etched surface to serve without additional binding medium as the finished coating.

6. The method of producing diffusing or colored bulbs for electric incandescent lamps and similar articles which consists in etching the inside surface thereof, and then rubbing a finely divided diffusing or coloring medium into said etched surface.

7. The method of producing diffusing or colored bulbs for electric incandescent lamps and similar articles which consists in frosting by etching the inside surface thereof, and then applying thereto a diffusing or coloring medium so as to produce a deposit of the finely divided medium in the depressions of said frosted surface to serve without additional binding medium as the finished coating.

8. The method of producing diffusing or colored bulbs for electric incandescent lamps and similar articles which consists in frosting by etching the inside surface thereof, and then rubbing a finely divided diffusing or coloring medium into said frosted surface.

9. A lamp comprising a glass bulb having a surface thereof etched and then coated with a finely divided diffusing or coloring medium deposited in the depressions of said etched surface and serving without additional binding medium as the finished coating.

10. A lamp comprising a glass bulb having a surface thereof etched and then coated with a finely divided mineral diffusing or coloring medium deposited in the depressions of said etched surface and serving without additional binding medium as the finished coating.

11. A lamp comprising a glass bulb having the inside surface thereof etched and then coated with a finely divided diffusing or coloring medium deposited in the depressions of said etched surface and serving without additional binding medium as the finished coating.

12. A lamp comprising a glass bulb having the inside surface thereof etched and then coated with a finely divided mineral diffusing or coloring medium deposited in the depressions of said etched surface and serving without additional binding medium as the finished coating.

13. The method of producing diffusing or colored bulbs for electric incandescent lamps and similar articles which consists in introducing into a bulb which has been frosted by etching the inside surface thereof a quantity of finely divided dry diffusing or coloring material and causing at least a part thereof to be deposited in the depressions of the etched surface.

14. A decorative incandescent electric lamp comprising a bulb having on the entire interior surface of the light transmitting portion thereof a visible light diffusing and light transmitting coating consisting of a multitude of visible particles of coloring medium adhering directly to said surface and characterized by an absence of varnish or other binding medium or fusion of the said particles.

15. An electric lamp which prior to any substantial operation or use thereof comprises a bulb having on its interior surface a visible light diffusing and light transmitting coating consisting of a multitude of visible particles of coloring medium adhering directly to said surface and characterized by an absence of varnish or other binding medium or fusion of the said particles.

16. An electric lamp comprising a bulb having on the interior surface thereof a light transmitting coating which is visible and light diffusing when originally applied, said coating consisting of a multitude of visible particles of coloring medium adhering directly to said surface and characterized by an absence of varnish or other binding medium or fusion of the said particles.

MARVIN PIPKIN.

CERTIFICATE OF CORRECTION.

Reissue No. 19,216. June 19, 1934.

MARVIN PIPKIN.

It is hereby certified that error appears in the printed specification of the above numbered patent requiring correction as follows: Page 1, line 26, after "have" insert found; and line 54, for "express" read excess; and that the said Letters Patent should be read with these corrections therein that the same may conform to the record of the case in the Patent Office.

Signed and sealed this 24th day of July, A. D. 1934.

Bryan M. Battey (Seal) Acting Commissioner of Patents.